United States Patent
Weeber et al.

(10) Patent No.: US 7,811,068 B2
(45) Date of Patent: Oct. 12, 2010

(54) METHODS AND APPARATUS FOR TRANSPORTING NATURAL GAS THROUGH A PIPELINE

(75) Inventors: Konrad Roman Weeber, Rexford, NY (US); Christopher Anthony Kaminski, Schenectady, NY (US); Yu Wang, Mason, OH (US); James Michael Fogarty, Schenectady, NY (US); Ralph James Carl, Jr., Clifton Park, NY (US); Charles Michael Stephens, Pattersonville, NY (US)

(73) Assignee: General Electric Company, Schenectady, NY (US)

( * ) Notice: Subject to any disclaimer, the term of this patent is extended or adjusted under 35 U.S.C. 154(b) by 483 days.

(21) Appl. No.: 11/274,988

(22) Filed: Nov. 16, 2005

(65) Prior Publication Data

US 2007/0110596 A1    May 17, 2007

(51) Int. Cl.
*F04B 39/06* (2006.01)
(52) U.S. Cl. .......................... 417/366; 310/59
(58) Field of Classification Search ........... 417/423.1, 417/63, 366; 310/156.48
See application file for complete search history.

(56) References Cited

U.S. PATENT DOCUMENTS

| | | | | |
|---|---|---|---|---|
| 4,725,750 | A * | 2/1988 | Welch | 310/156.49 |
| 5,957,667 | A * | 9/1999 | Epp | 417/271 |
| 6,200,108 | B1 * | 3/2001 | Caudill et al. | 417/366 |
| 6,203,294 | B1 * | 3/2001 | Turley et al. | 417/423.11 |
| 6,261,070 | B1 * | 7/2001 | Johnson | 417/366 |
| 6,305,915 | B1 * | 10/2001 | Paddock et al. | 417/423.12 |
| 6,369,478 | B1 * | 4/2002 | Koharagi et al. | 310/156.48 |
| 6,564,627 | B1 * | 5/2003 | Sabini et al. | 73/168 |
| 7,388,310 | B2 * | 6/2008 | Abou-Akar et al. | 310/156.48 |
| 2001/0012489 | A1 * | 8/2001 | Harakawa et al. | 417/371 |
| 2001/0022939 | A1 * | 9/2001 | Morita et al. | 417/366 |
| 2001/0026761 | A1 * | 10/2001 | Repple et al. | 417/292 |
| 2002/0048521 | A1 * | 4/2002 | Achtelik et al. | 418/47 |

* cited by examiner

*Primary Examiner*—Devon C Kramer
*Assistant Examiner*—Bryan Lettman
(74) *Attorney, Agent, or Firm*—Armstrong Teasdale LLP

(57) ABSTRACT

A compressor assembly for use in transporting natural gas is provided. The assembly includes a natural gas compressor comprising at least one stage of compression, a permanent magnet-type super-synchronous motor coupled to the natural gas compressor for powering said compressor, and a housing, the compressor positioned within the housing, and the compressor configured to facilitate increasing a pressure of natural gas being transmitted.

19 Claims, 4 Drawing Sheets

METHODS AND APPARATUS FOR TRANSPORTING NATURAL GAS THROUGH A PIPELINE

BACKGROUND OF THE INVENTION

This invention relates generally to natural gas transfer systems and, more particularly, to methods and apparatus for transporting natural gas through a pipeline.

Gas compression is needed in the chemical, oil and gas industry, mainly for pumping natural gas from on-shore or off-shore wells to processing plants, for subsequent gas transmission or for collection in storage facilities for use in peak hours. In at least some other applications, gas compression is also needed for downstream applications in hydrocarbon processing industries and chemical industries, and to facilitate distribution to gas end-users.

Natural gas typically includes methane as the principle constituent and may also include other substances including impurities. Natural gas pipeline compressors are conventionally driven by gas turbines, sub-synchronous motors with a gearbox, and/or by high-speed directly coupled induction or synchronous motors. Known sub-synchronous motors have an in-service rotor speed of less than 3,000 revolutions per minute (rpm) for 50 Hz electrical power supplies and less than 3,600 rpm for 60 Hz electrical power supplies. Known synchronous motors have an in-service rotor speed of approximately 3,000 rpm for 50 Hz electrical power supplies and approximately 3,600 rpm for 60 Hz electrical power supplies. Known super-synchronous motors have an in-service rotor speed of greater than 3,000 rpm for 50 Hz electrical power supplies and greater than 3,600 rpm for 60 Hz electrical power supplies.

Electric drives (motors) may be advantageous over mechanical drives (gas turbines) in operational flexibility (variable speed), maintainability, reliability, lower capital cost and lower operational cost, better efficiency and environmental compatibility. Additionally, electric drives generally require a smaller foot print, are easier to integrate with the compressor, and have the potential for higher reliability than mechanical drives. For example, some known electric drives do not utilize a gearbox to facilitate an increased compressor speed and as such are generally simpler in construction than mechanical drives. Super-synchronous electric drives may increase operating efficiency by operating with an increased speed that facilitates compressing the transported gas more rapidly.

However, electric drives may be more difficult to seal. For example, some known super-synchronous electric drives do not utilize external gas seals. In addition, at least some known super-synchronous electric drives utilize an internal seal system, i.e. dry gas seals, to facilitate sealing the process gas from the environment. However, the complexity of such sealing systems may lead to reduced availability and increased maintenance costs. Moreover, such seal systems may be prone to produce leakage either to the process gas (contamination) or to the environment (flaring).

BRIEF DESCRIPTION OF THE INVENTION

In one aspect, a compressor assembly for use in transporting natural gas is provided. The assembly includes a natural gas compressor comprising at least one stage of compression, a permanent magnet-type super-synchronous motor coupled to the natural gas compressor for powering the compressor, and a housing, the compressor positioned within said housing, the compressor configured to facilitate increasing a pressure of natural gas being transmitted.

In another aspect, a method to facilitate transporting natural gas through a pipeline is provided. The method includes receiving natural gas from a first section of the pipeline at a first pressure, compressing the gas using a compressing station driven by a prime mover that includes a rotor including permanent magnets, the compressed gas being at a second pressure that is greater than the first pressure, and discharging the gas at the second pressure into a second section of the pipeline, downstream from the first section of pipeline.

In a further aspect, a compressing station for use in transporting natural gas is provided. The compressing station includes a natural gas compressor for increasing a pressure of natural gas being transported, a piping system that facilitates natural gas transport, the piping system coupled in flow communication to the compressor, a permanent magnet-type super-synchronous motor coupled to the compressor for powering the compressor, a power converter coupled to the motor, and a speed and torque control system for controlling the motor.

DETAILED DESCRIPTION OF THE INVENTION

Figure 1:
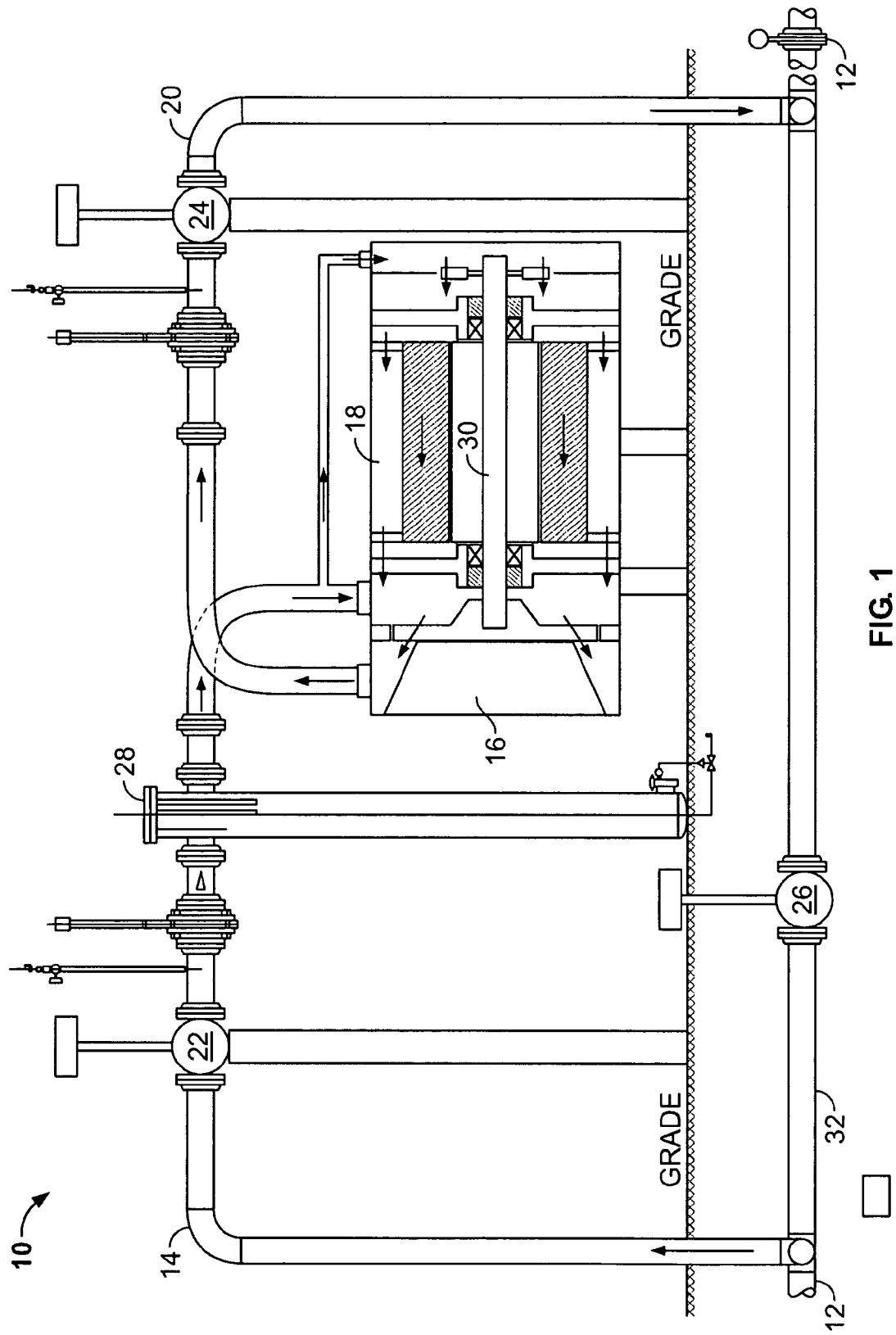
FIG. 1 is an exemplary embodiment of an above-ground natural gas compressing station.

FIG. 1 is an exemplary embodiment of an above-ground natural gas compressing station 10. A natural gas pipeline 12 is coupled to a suction header 14 that enables gas flow into a natural gas compressor 16 powered by a motor 18. Gas entering compressor 16 is compressed and returned to pipeline 12 via a discharge header 20. A compressor inlet blocking valve 22 and an outlet blocking valve 24 facilitate control of compressor 16. A bypass header 32 includes a compressing station bypass blocking valve 26. A scrubber 28 is coupled in flow communication in suction header 14 to facilitate removing contaminants from the gas prior to gas introduction into compressor 16. In the exemplary embodiment, compressor 16 and motor 18 are coupled to a common compressor/motor shaft 30.

Gas flows from pipeline 12 through station 10 as illustrated by the arrows included in FIG. 1. Suction header 14 channels gas to compressor 16 based on the relative positions of blocking valve 22, blocking valve 24, and blocking valve 26. For example, blocking valves 22 and 24 are normally open to permit gas flow through station 10. Gas subsequently flows into compressor 16 and is compressed to a greater density and smaller volume. Motor 18 drives compressor 16 via common shaft 30. Compressed gas exits compressor 16 through discharge header 20. Valves 22 and 24 may be closed to isolate components, such as scrubber 28, compressor 16 and/or motor 18 during maintenance operations.

Bypass header blocking valve 26 is normally closed to prevent the gas from back-flowing from discharge header 20 to suction header 14 when compressor 16 is in service. Valve 26 may be open when station 10 is out of service for maintenance or other operational requirements.

Figure 2:
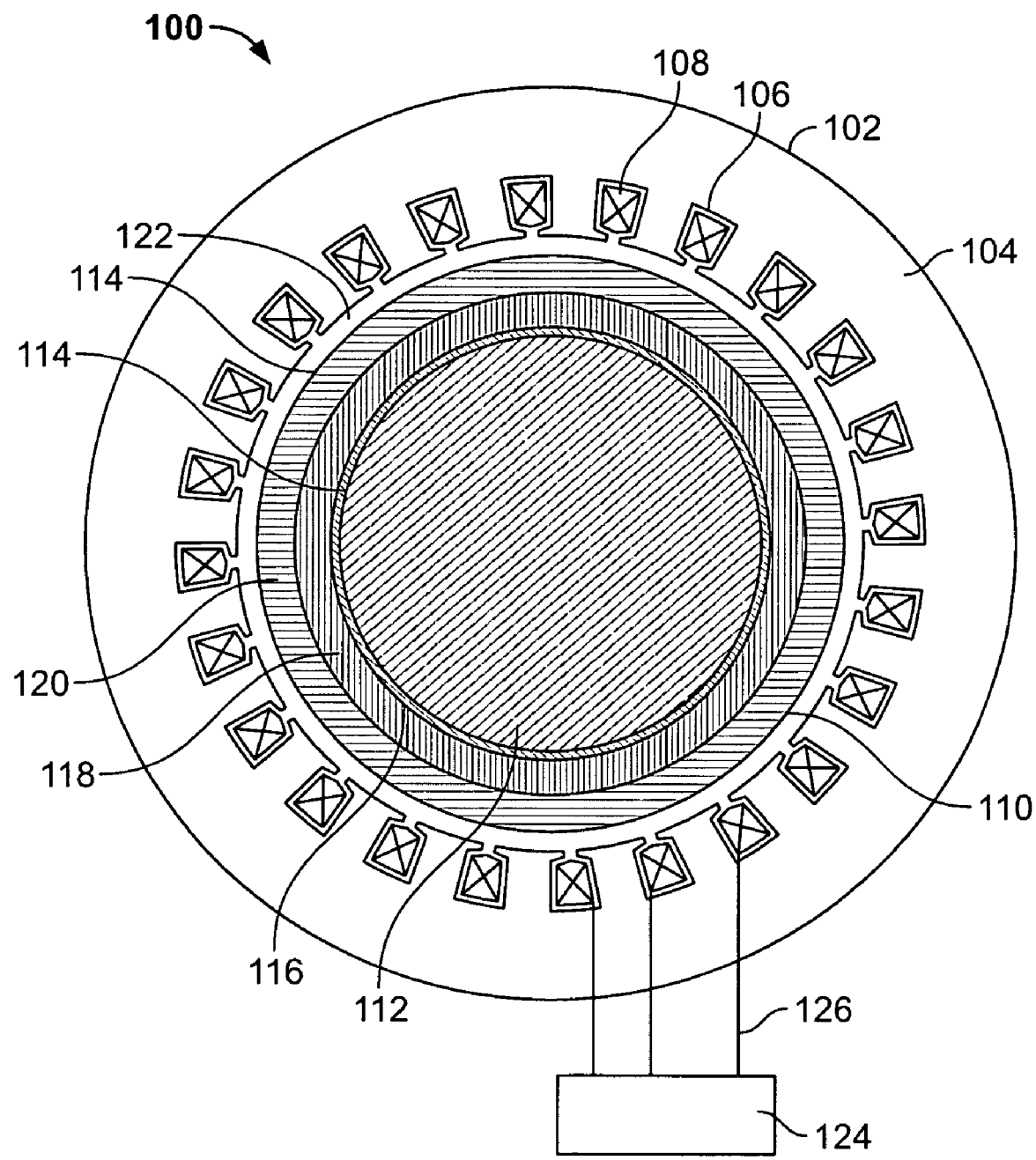
FIG. 2 is a schematic view of an exemplary permanent magnet-type super-synchronous electric motor that may be used with the natural gas compressing station shown in FIG. 1.

FIG. 2 is a schematic view of a permanent magnet-type super-synchronous electric motor 100 that may be used with natural gas compression station 10. Motor 100 includes a stator 102 having a stationary core 104 formed therein with a plurality of slots 106 and three-phase armature windings 108 wound in slots 106. A rotor 110 includes a shaft 112 fabricated from conductive magnetic materials. An intermediate sleeve 114 is generally fabricated from the same materials as that of shaft 112 and extends circumferentially around shaft 112. Intermediate sleeve 114 contains a high-tensile strength electromagnetic steel sheet 116, a plurality of conductive permanent magnets 118, and a reinforcing member 120 fabricated from conductive carbon fibers.

Permanent magnets 118 surround an outer periphery of intermediate sleeve 114 and reinforcing member 120 extends circumferentially around permanent magnets 118. Magnets 118 may include, but are not limited to, high energy density rare earth permanent magnet materials, for example, Neodymium-Iron-Boron (Nd—Fe—B) or Samarium-Cobalt (Sm—Co). An index that is typically used to define and compare the energy densities of magnets, including permanent magnets, is a Maximum Energy Product, often referred to as $BH_{Max}$. $BH_{Max}$ is a product of a magnetic field flux density (B) multiplied by an associated magnetic field strength (H) for a particular magnetic field. A resultant product represents a maximum, theoretically possible, energy density associated with a particular magnet. Common values of $BH_{Max}$ for Nd—Fe—B permanent magnets may be in the range of 79.6 to 382 kilojoules per cubic meter ($kJ/m^3$) (10 to 48 Mega-Gauss-Oersteds (MGOe). Common values of $BH_{Max}$ for Sm—Co permanent magnets may be in the range of 119 to 255 $kJ/m^3$ (15 to 32 MGOe). For comparison, magnets with lower energy densities include flexible permanent magnets with $BH_{Max}$ in the range of 4.8 to 12.7 $kJ/m^3$ (0.6 to 1.6 MGOe). The higher energy densities of the Nd—Fe—B and Sm—Co permanent magnets facilitate a greater resistance to demagnetization and longer useful in-service life. Alternately, non-rare earth permanent magnets may be used.

A rotor-to-stator air gap 122 facilitates an interaction of rotor 110 and stator 102 magnetic fields to generate a rotational force that induces a rotation in rotor 110. A power source, for example, a variable frequency drive (VFD) 124, is coupled to motor 100 through a plurality of power supply cables 126. Rotor 110 can also be coupled to a device, for example, a compressor, such as compressor 16 (shown in FIG. 1), that induces a load on motor 100.

In the exemplary embodiment of motor 100, VFD 124 supplies three-phase alternating current to the armature windings 108 at pre-determined voltages and frequencies. A rotating electromagnetic field is generated in stator 102. The relative strength of the magnetic field is proportional to the voltage delivered by VFD 124. Magnets 118 induce a magnetic field. As the magnetic field of stator 102 rotates the magnetic field of rotor 110 interacts with the magnetic field of stator 102 in air gap 120. More specifically, the magnetic field induced in rotor 110 attempts to align itself with the magnetic field induced in stator 102. The interaction of the two magnetic fields induces torque, and subsequently, rotation of rotor 110.

Permanent magnet-type super-synchronous electric motor 100 in the exemplary embodiment provides a variety of features that are advantageous over alternate drive mechanisms. For example, this embodiment facilitates motor 100 speeds in a range of approximately 10,000 to 20,000 revolutions per minute (rpm) without additional components for stepping up output speed, for example, gearboxes. Alternately, motor speeds in excess of 20,000 rpm may be used. The increased speeds allow for more rapid pressurization of the gas which thereby increases the efficiency and effectiveness of compressing station 10. Additionally, the elimination of additional components in this embodiment, for example, gearboxes, results in a smaller foot print and elimination of the associated maintenance. Another feature of this embodiment is the elimination of wearable components, such as carbon-based slip rings. The elimination of maintenance on a gearbox, or similar component, and the slip rings facilitates increased reliability of the compressing station 10.

Figure 3:
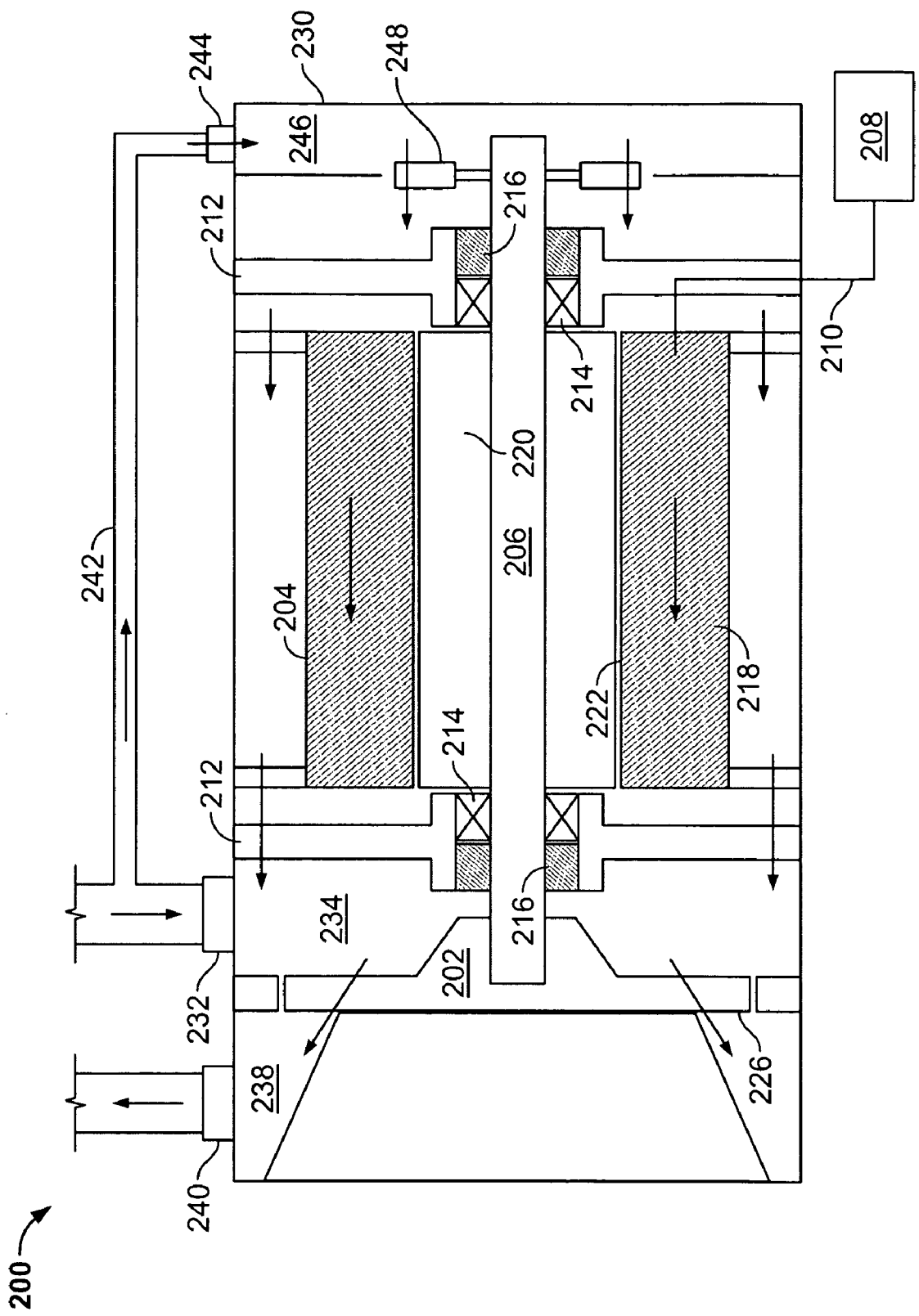
FIG. 3 is a schematic view of an exemplary in-line compressor/motor assembly that may be used with the natural gas compressing station shown in FIG. 1.

FIG. 3 is a schematic view of an exemplary in-line compressor/motor assembly 200 that may be used with natural gas compressing station 10 (shown in FIG. 1). Assembly 200 includes a natural gas centrifugal compressor 202 coupled to a permanent magnet-type super-synchronous electric motor 204 via a common shaft 206. Motor 204 receives electric power from a VFD 208 via a plurality of power supply cables 210. A plurality of motor supports 212 provide axial and radial support for motor 204 and compressor 202 in conjunction with a plurality of magnetic bearings 214 and a plurality of rundown bearings 216. Rundown bearings 216 provide axial and radial support to shaft 206 in event of magnetic bearings 214 failure.

Magnetic bearings 214 may be of the active-type. A control sub-system (not shown in FIG. 3) may be used in conjunction with magnetic bearings 214 to determine a location of the rotational bearing component (not shown in FIG. 3) relative to the fixed component (not shown in FIG. 3) at any given time and facilitate magnetic adjustments to correct any deviations at any given angular position. Alternately, non-magnetic bearings, for example, roller bearings, may be used.

Motor 204 also includes a plurality of stator windings 218, a rotor 220 and an air gap 222. Rotor 220 includes a plurality of permanent magnets 118 (shown in FIG. 2). Compressor 202 includes at least one centrifugal wheel 226. A plurality of diffuser vanes (not shown in FIG. 3) may be used to facilitate channeling of compressor 202 discharge. Bearings 214 and 216 provide axial and radial support to compressor 202 as well as motor 204 via shaft 206.

Compressor 202 and motor 202 are positioned in a housing 230. Housing 230 includes an intake flange 232, an intake plenum 234, a discharge plenum 238 and a discharge flange 240. A plurality of axial guide vanes (not shown in FIG. 3) may be positioned within discharge plenum to facilitate channeling of compressor 202 discharge. Supports 212 are coupled to housing 230.

In the exemplary embodiment, assembly 200 also includes a motor cooling gas supply header 242, a motor cooling supply flange 244, a supply plenum 246 and a motor cooling fan 248.

Gas flow paths through assembly 200 are illustrated in FIG. 3 with arrows. Compressor 202 draws gas received from a pipeline (not shown in FIG. 3) coupled in flow communication to assembly 200 through inlet flange 232. Motor 204 rotates compressor 202 via shaft 206. Gas enters inlet flange 232 and is directed into intake plenum 234. Rotation of compressor wheel 226 induces a radially outward force into the gas which facilitates transport of the gas into discharge plenum 238 and into the pipeline (not shown in FIG. 3) which is connected to assembly 200 via discharge flange 240. The narrowing configuration of plenum 238 facilitates increasing the pressure of the gas prior to the gas being returned to the pipeline.

A portion of gas flows through motor stator windings 218 to cool motor 204. Gas is pulled from the inlet gas flow stream prior to entry into inlet plenum 234 via motor cooling gas supply header 242. The gas enters plenum 246 via flange 244. Fan 248 is rotatably coupled to shaft 206 and rotates with shaft 206 during assembly 200 operation. Fan 248 induces a bias in the gas positioned within plenum 246 to flow towards fan inlet plenum 234 via motor winding s 218. Transfer of heat generated within stator windings 218 to the gas is facilitated. The gas also flows between windings 218 and assembly casing 230 to facilitate heat removal from assembly 200. Gas pressures above one atmosphere, i.e., 101.3 kilopascals (kPa) (14.7 pounds per square inch (psi)), within motor stator windings 218 facilitate effective motor cooling. Cooling gas from inside and outside of stator 218 exits via openings (not shown in FIG. 3) defined in motor supports 212 where it is combined with gas flow entering plenum 234 prior to being pulled into compressor 202.

The pressure of the gas exiting compressor 202 is proportional to the speed of compressor wheel 226 rotation. The rotational speed is proportional to the output torque of motor 204. Therefore, assembly 200 discharge pressure is proportional to motor torque.

Although a single stage centrifugal compressor is illustrated in FIG. 3, assembly 200 is exemplary only. Additional embodiments may include a centrifugal compressor with more than one stage. Additional embodiments can also include other types of compressors, for example, but not limited to, axial or ducted-fan types.

FIG. 3 also illustrates an in-line configuration. Alternate embodiments can include a configuration wherein motor 204 is external to the gas flow path, is rotatably coupled directly to compressor 202, and heat is removed from motor 204 by a separate cooling method, for example, air flow. Apparatus for rotatable couplings may include a rigid coupling. Alternately, flexible couplings such as membrane-type flexible couplings including diaphragm couplings, flexible link couplings, or laminated disc couplings may be used.

Figure 4:
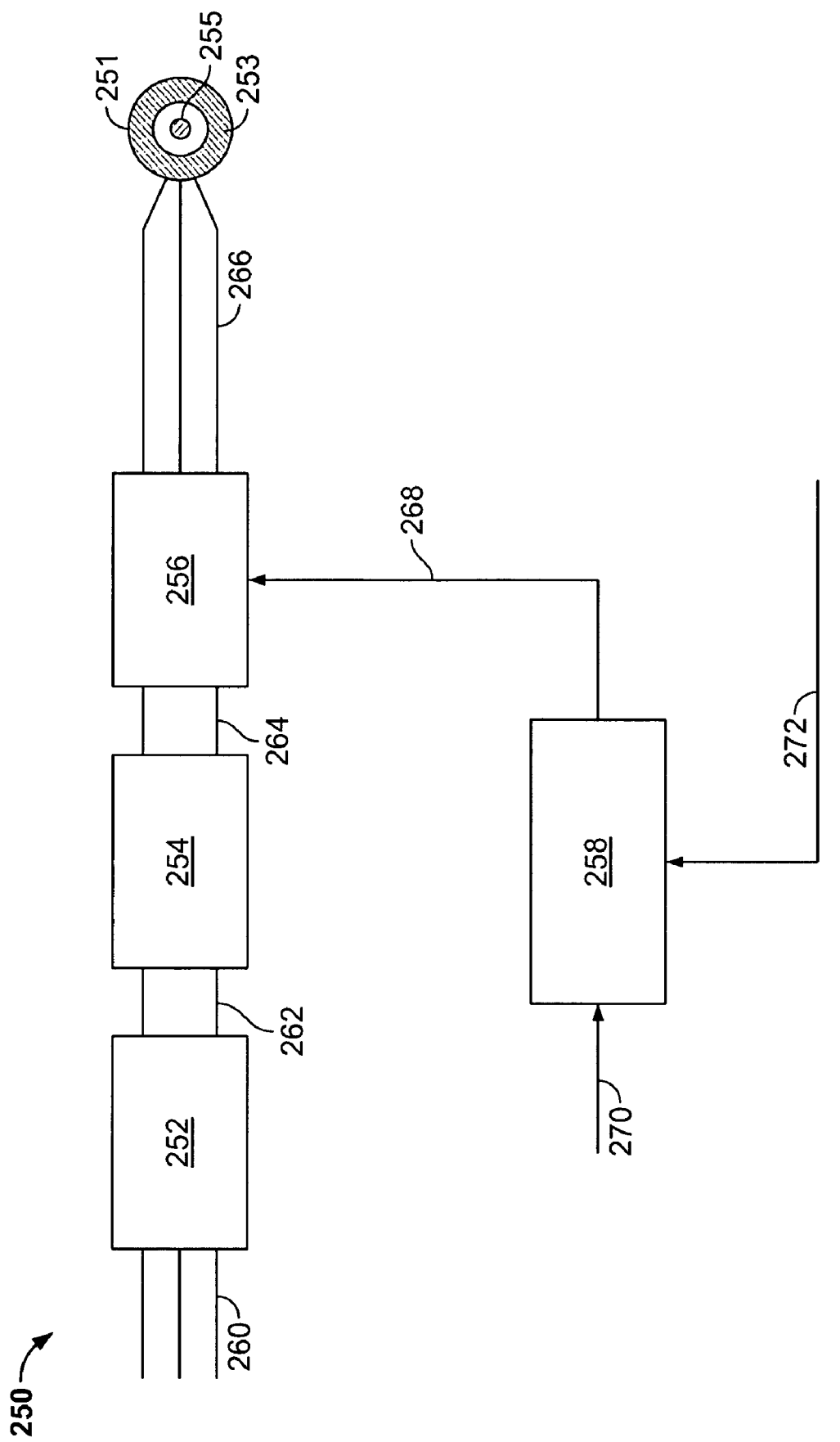
FIG. 4 is a block diagram of an exemplary variable frequency drive (VFD) that can be used with the natural gas compressing station shown in FIG. 1.

FIG. 4 is a basic block diagram of an exemplary variable frequency drive (VFD) 250 that can be used with natural gas compressing station 10 (shown in FIG. 1). VFD 250 includes a diode bridge rectifier 252, a direct current (DC) filter circuit 254, an inverter 256, and a control regulator 258. VFD 250 uses pulse width modulation (PWM) to control a permanent magnet-type super-synchronous electric motor 251. Motor 251 includes a stator 253 and a rotor 255. Rotor 255 includes a plurality of high energy density permanent magnets (not shown on FIG. 4) that induce a magnetic field. The PWM features enable the magnitude of stator 253 voltage and frequency to be varied via inverter 256. Varying the voltage and frequency of transmitted power to stator 253 controls the speed and torque of rotor 255.

Rectifier 252 receives a three-phase, alternating current (AC) input signal 260 as the primary power input for powering stator 253. Rectifier 252 rectifies AC signal 260 into a DC signal 262 that may include high frequency components in addition to a DC component. DC signal 262 is received by filter circuit 254 that removes the high frequency components and transmits a filtered, smooth DC output signal 264 to inverter 256. Regulator 258 processes a plurality of reference signals 270 and a plurality of feedback signals 272 and generates signal 268. In one embodiment reference signals 270 are indicative of desired motor rotor 255 speed, and feedback signals 272 are indicative of actual motor rotor 255 speed. Alternate embodiments for signals 270 and 272 may include stator current, rotor position, and stator frequency in lieu of or in addition to motor rotor speed.

Inverter 256 receives a plurality of input control signals 268 from regulator 258. Control signals 268 include a plurality of commands that control inverter 256. Inverter 256 modifies signal 264 based on received signals 268 to generate a plurality of output pulses 266 that are transmitted to stator 253 by modulating signal 266 voltage pulse width and frequency to stator 253 thereby adjusting the electromagnetic field of stator 253 as necessary to maintain a pre-determined voltage-to-frequency ratio. The output torque generated by the interaction of the magnetic fields of stator 253 and rotor 255 is transmitted to rotor 255. The output torque transmitted to rotor 255 is translated into rotation of rotor 255 wherein the modulation of torque to rotor 255 controls the speed of rotor 255. Regulator 258 calculates stator 253 winding voltage pulse width and frequency to operate motor 251 at a desired speed. The power signal 266 transmitted to stator 253 from inverter 256 increases with lengthened pulse widths that subsequently increases motor 251 output torque and speed of rotor 255.

Modulation of motor 251 output torque and rotor 255 speed facilitates effective control of compressing station 10 (in FIG. 1) by leveraging the intrinsic advantageous features of permanent magnet-type super-synchronous electric motors. For example, in the event that gas pressure downstream of station 10 (in FIG. 1) is desired, the rotor 255 speed and torque are increased to pre-determined values and the gas pressure exiting compressor 202 (in FIG. 3) is increased accordingly.

The compressing station described herein facilitates transporting natural gas through a pipeline. More specifically, the compressing station assembly includes a compressing device coupled to a permanent magnet-type super-synchronous electric motor. Permanent magnet-type super-synchronous electric motors have the advantages associated with electric induction motors, including less and smaller components resulting in a smaller foot print, as well as the advantages of higher efficiency due the capability to operate at higher speeds and elimination of wearable components, such as carbon-based slip rings. As a result, the operating efficiency of compressing stations may be increased and the stations' capital and maintenance costs may be reduced.

Although the methods and systems described and/or illustrated herein are described and/or illustrated with respect to a natural gas compressing station, and more specifically a permanent magnet-type super-synchronous electric motor, practice of the methods and systems described and/or illustrated herein is not limited to permanent magnet-type super-synchronous electric motors nor to natural gas compressing stations generally. Rather, the methods and systems described and/or illustrated herein are applicable to driving any machine in any configuration in any system.

Exemplary embodiments of natural gas transport methods are described above in detail. The methods, apparatus and systems are not limited to the specific embodiments described herein nor to the specific natural gas compressing station arrangements assembled, but rather, the natural gas compressing station arrangements may be utilized independently and separately from other methods, apparatus and systems described herein or to assemble other natural gas compressing station arrangements not described herein. For example, other natural gas compressing station arrangements can also be assembled using the methods described herein.

While the invention has been described in terms of various specific embodiments, those skilled in the art will recognize that the invention can be practiced with modification within the spirit and scope of the claims.

What is claimed is:

1. A compressor assembly for use in transporting natural gas, said assembly comprising:
    a natural gas compressor comprising at least one stage of compression, that increases a pressure of natural gas flowing therethrough;
    a permanent magnet-type super-synchronous motor coupled to said natural gas compressor for powering said compressor;
    a housing comprising an inner surface and an outer surface, said inner surface defines a cooling plenum and a compressor intake plenum, said compressor and said permanent magnet-type super synchronous motor both positioned within said housing;
    a suction header for supplying gas from a source upstream from said compressor assembly to said compressor assembly, said suction header coupled to said housing outer surface for channeling an inlet gas flow stream into said compressor intake plenum; and
    a cooling gas supply header coupled to said suction header such that a portion of the inlet gas flow stream upstream from said housing outer surface is diverted from said suction header and is channeled to said cooling plenum to facilitate cooling said permanent magnet-type super-synchronous motor.

2. A compressor assembly in accordance with claim 1 wherein said compressor comprises at least one of an axial-type compressor, a centrifugal-type compressor, and a ducted fan-type compressor.

3. A compressor assembly in accordance with claim 1 wherein said permanent magnet-type super-synchronous motor comprises a plurality of high-energy density magnets.

4. A compressor assembly in accordance with claim 1 wherein said compressor and said motor are coupled together via a rotatable coupling extending between said compressor and said motor.

5. A compressor assembly in accordance with claim 1 wherein said housing comprises a plurality of piping connections that facilitate fluid flow into said compressor and fluid flow out of said compressor.

6. A compressor assembly in accordance with claim 1 wherein said housing comprises a plurality of housing elements sealingly coupled to each other.

7. A compressor assembly in accordance with claim 6 wherein said motor and said compressor are coupled together and positioned in said housing such that at least a portion of gas supplied to said compressor is channeled to said motor to facilitate cooling said motor.

8. A compressor assembly in accordance with claim 7 wherein said compressor is axially and radially supported via a plurality of magnetic bearings.

9. A method to facilitate transporting natural gas through a pipeline, said method comprising:
    receiving natural gas from a first section of the pipeline at a first pressure;
    compressing the gas using a compressing device driven by a prime mover that includes a rotor including permanent magnets, the compressing device and the prime mover both enclosed in a housing that includes an inner surface and an outer surface, the inner surface defines a cooling plenum and an intake plenum, the compressed gas being at a second pressure that is greater than the first pressure;
    channeling a portion of an inlet gas flow stream from the first section of the pipeline through a suction header into the intake plenum, the suction header for supplying natural gas from a source upstream from the compressing device to the compressing device;
    diverting a portion of the inlet gas flow stream, upstream from the housing outer surface, from the suction header through a cooling gas supply header coupled to the housing outer surface to the cooling plenum to facilitate cooling the compressing device; and
    discharging the gas at the second pressure into a second section of the pipeline, downstream from the first section of pipeline.

10. A method in accordance with claim 9 wherein receiving the natural gas from a first section of the pipeline comprises using at least a portion of the natural gas to facilitate cooling at least a portion of the prime mover.

11. A method in accordance with claim 9 wherein compressing the gas comprises coupling the compressing device to a permanent magnet-type super-synchronous electric motor.

12. A method in accordance with claim 11 wherein coupling the compressing device to a permanent magnet-type super-synchronous electric motor comprises:
    coupling the compressing device and the motor together via a common rotatable shaft; and
    positioning the compressing device and the permanent magnet-type super-synchronous motor in a common housing to form a fully enclosed unit such that at least a portion of gas supplied to the housing is channeled to the motor to facilitate cooling the motor.

13. A compressing station for use in transporting natural gas, said compressing station comprising:
    a natural gas compressor for increasing a pressure of natural gas being transported;
    a piping system for facilitating natural gas transport, said piping system coupled in flow communication to said compressor;
    a permanent magnet-type super-synchronous motor coupled to said compressor for powering said compressor;
    a housing comprising an inner surface and an outer surface, said inner surface defines a cooling plenum and a compressor intake plenum, said compressor and said permanent magnet-type super synchronous motor both positioned within said housing;
    a suction header for supplying gas from a source upstream from said compressing station to said compressing station, said suction header coupled to said housing outer surface for channeling an inlet gas flow stream into said compressor intake plenum;
    a cooling gas supply header coupled to said suction header such that a portion of the inlet gas flow stream upstream from said housing outer surface is diverted from said suction header, and is channeled to said cooling plenum to facilitate cooling said permanent magnet-type super-synchronous motor;
    a power converter coupled to said motor; and
    a speed and torque control system for controlling said motor.

14. A compressing station in accordance with claim 13 wherein said compressor comprises at least one of an axial-type compressor, a centrifugal-type compressor, and a ducted fan-type compressor.

15. A compressing station in accordance with claim 13 wherein said piping system comprises a plurality of piping, a plurality of valves, and a plurality of piping supports.

16. A compressing station in accordance with claim 13 wherein said permanent magnet-type super-synchronous motor comprises high energy density magnets.

17. A compressing station in accordance with claim 13 wherein said motor and said compressor are axially and radially supported via a plurality of magnetic bearings such that at least a portion of gas supplied to said compressor facilitates cooling said motor.

18. A compressing station in accordance with claim 13 wherein said power converter comprises a variable frequency drive (VFD) device wherein said VFD comprises a frequency converter device.

19. A compressing station in accordance with claim 13 wherein said speed and torque control system comprises a variable frequency drive (VFD) device wherein said VFD comprises a frequency converter device.

* * * * *